United States Patent
Komura et al.

(10) Patent No.: US 7,288,334 B2
(45) Date of Patent: Oct. 30, 2007

(54) FUEL CELL STACK AND METHOD OF PRODUCING THE SAME

(75) Inventors: Takashi Komura, Iruma-gun (JP);
Toshiki Kawamura, Niiza (JP);
Masaaki Sakano, Utsunomiya (JP);
Kentaro Nagoshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 506 days.

(21) Appl. No.: 10/747,014

(22) Filed: Dec. 23, 2003

(65) Prior Publication Data

US 2004/0142228 A1  Jul. 22, 2004

(30) Foreign Application Priority Data

Dec. 27, 2002 (JP) ............................. 2002-379772
Dec. 2, 2003 (JP) ............................. 2003-402644

(51) Int. Cl.
*H01M 8/02* (2006.01)
(52) U.S. Cl. ........................................ 429/34
(58) Field of Classification Search .................. 429/34
See application file for complete search history.

(56) References Cited

U.S. PATENT DOCUMENTS 3,451,853 A * 6/1969 Spahrbier .................. 429/36
4,371,433 A   2/1983 Balko et al.
6,468,685 B1* 10/2002 Yoshida ...................... 429/34
2002/0058177 A1  5/2002 Nishiyama et al.
2002/0127463 A1  9/2002 Sugita et al.
2003/0219644 A1 11/2003 Inal et al.

FOREIGN PATENT DOCUMENTS

| EP | 0959511 A2 | 11/1999 |
|----|---|---|
| EP | 1387424 A2 | 2/2004 |
| JP | 06-290803 | 10/1994 |
| JP | 10-134835 | 5/1998 |
| JP | 2000-048778 | 2/2000 |
| JP | 2002-100392 | 4/2002 |
| JP | 2002-252022 | 9/2002 |
| WO | WO 03/094267 A1 | 11/2003 |

* cited by examiner

*Primary Examiner*—Susy Tsang-Foster
*Assistant Examiner*—Cynthia Lee
(74) *Attorney, Agent, or Firm*—Lahive & Cockfield, LLP; Anthony A. Laurentano, Esq.

(57) ABSTRACT

A terminal plate of a fuel cell stack includes an electron conductive area and a passage area. The electron conductive area is connected to an anode. The passage area includes passages for supplying an oxygen-containing gas, a fuel gas, and coolant to a membrane electrode assembly. The electron conductive area is made of composite of foamed metal and insulating resin. The passage area is made of the insulating resin. The electron conductive area and the passage area are combined together by injection molding, for example.

14 Claims, 18 Drawing Sheets

FUEL CELL STACK AND METHOD OF PRODUCING THE SAME

BACKGROUND OF THE INVENTION

1. Field of the Invention

The present invention relates to a fuel cell stack formed by stacking an electrolyte electrode assembly and separators alternately, and providing terminal plates at opposite ends in a stacking direction of the fuel cell stack. The electrolyte electrode assembly includes a pair of electrodes, and an electrolyte interposed between the electrodes. Further, the present invention relates to a method of producing the fuel cell stack.

2. Description of the Related Art

Generally, a solid polymer electrolyte fuel cell employs a membrane electrode assembly (MEA) which comprises a pair of electrodes (anode and cathode) and an electrolyte membrane interposed between the electrodes. The electrolyte membrane is a polymer ion exchange membrane. The membrane electrode assembly is interposed between separators.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

At opposite ends of the fuel cell in a stacking direction, terminal plates for collecting electrical energy generated in the fuel cell are provided. Insulator plates are provided on the outside of the terminal plates. Further, end plates for tightening the fuel cell are provided on the outside of the insulator plates.

In the fuel cell, passages for a fuel gas, an oxygen-containing gas, and a coolant are provided. It has been pointed out that leakage of electrical energy through water produced in the power generation or a coolant may occur undesirably. In an attempt to address the problem, U.S. Pat. No. 4,371,433 discloses a technique in which sealing grommets (tubular members) such as insulating rubbers are inserted into reactant gas passages formed in bipolar plates of a fuel cell for insulating the reactant gas passages.

However, U.S. Pat. No. 4,371,433, is not practical. In order to effectively prevent leakage of electrical energy, the grommet needs to be attached to each of the terminal plates, the insulating plates, and the end plates. Therefore, a large number of grommets are required, and the overall cost of the fuel cell is large.

The entire terminal plate is generally made of a conductive metal, and has a considerably large mass. The terminal plate needs to have at least a certain thickness for preventing losses due to electrical resistance in collecting electrical energy from the terminal plate. Consequently, the terminal plate has a large mass, and the fuel cell including the terminal plate is heavy.

SUMMARY OF THE INVENTION

A general object of the present invention is to provide a fuel cell stack and a method of producing the fuel cell stack in which electrical energy is collected from terminal plates desirably, and the terminal plates have a lightweight.

According to the present invention, terminal plates are provided at opposite ends in a stacking direction of a fuel cell stack.

Each of the terminal plates has an electron conductive area connected to the electrode, and a passage area including at least one of a reactant gas passage and a coolant passage. The electron conductive area is made of a composite of porous metal and resin, and the passage area is made of insulating resin.

Preferably, the terminal plate includes a terminal connected to the electron conductive area for collecting electrical energy from the fuel cell stack to the outside. Metal density changes in the electron conductive area such that metal density gets higher at a position closer to the terminal. The electrical resistance is low near the terminal. Therefore, heat generation due to concentration of electric current flowing toward the terminal does not occur. The metal is used as needed. Therefore, the amount of metal used near the terminal is optimized according to the amount of electric current flowing into the terminal. Thus, by changing metal density depending on the position in the electron conductive area, it is possible to effectively reduce the total amount of metal used in the electron conductive area. The terminal plate thus produced has a lightweight in comparison with a terminal plate using foamed metal having a uniform metal density.

Preferably, a surface of the electron conductive area in contact with the separator is coated using a conductive material such as gold, platinum, or a metal which is not oxidized easily. Since it is not required to coat the entire surface of the electron conductive area, the amount of noble metal used for coating is small, and the contact resistance is small.

Preferably, the terminal includes a planar portion connected to a surface of the electron conductive area. Thus, the terminal and the electron conductive area are suitably combined with high rigidity. Electrical energy can be collected efficiently.

Preferably, the porous metal and the insulating resin are combined together in the electron conductive area by injection molding or resin impregnation molding. The injection molding and resin impregnation molding are effective in filling the insulating resin into pores of the foamed metal in comparison with heat compression molding using resin pellets. With the simple production process, it is possible to produce the terminal plate of the desired quality easily at a low cost. The time needed for molding is reduced dramatically, and the production of the fuel cell stack is carried out efficiently.

Preferably, the electron conductive area is produced before combining the electron conductive area and the passage area together. The resin used for the passage area may be different from the resin used for the electron conductive area. Thus, suitable resin for the non-electron conductive passage area can be selected from various types of resin. For example, resin combined with a seal, resin which does not absorb much water, or resin which is reinforced by a glass fiber may be used as the insulating resin for the passage area.

The electron conductive area and the terminal may be connected by diffusion bonding or brazing for connecting the electron conductive area and the terminal at a large number of connecting points. Thus, the electrical resistance between the electron conductive area and the terminal is small.

The electron conductive area and the terminal may be connected by electron beam welding or laser beam welding for limiting raise of temperature at a local point. Thus, the thermal deformation can be minimized.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
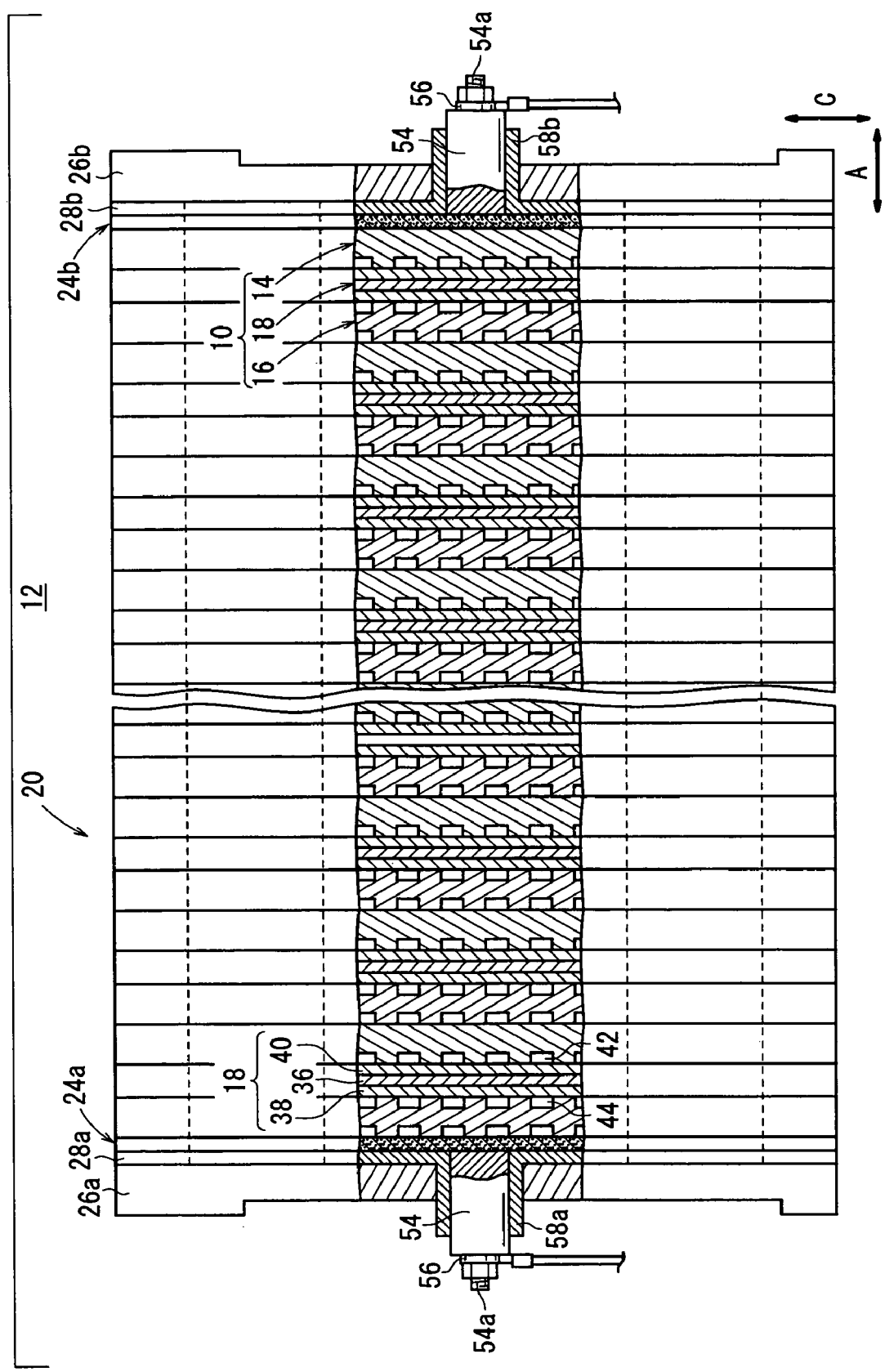
FIG. 1 is a perspective view showing a fuel cell stack, partially in cross section, formed by stacking fuel cells according to a first embodiment of the present invention.
Figure 2:
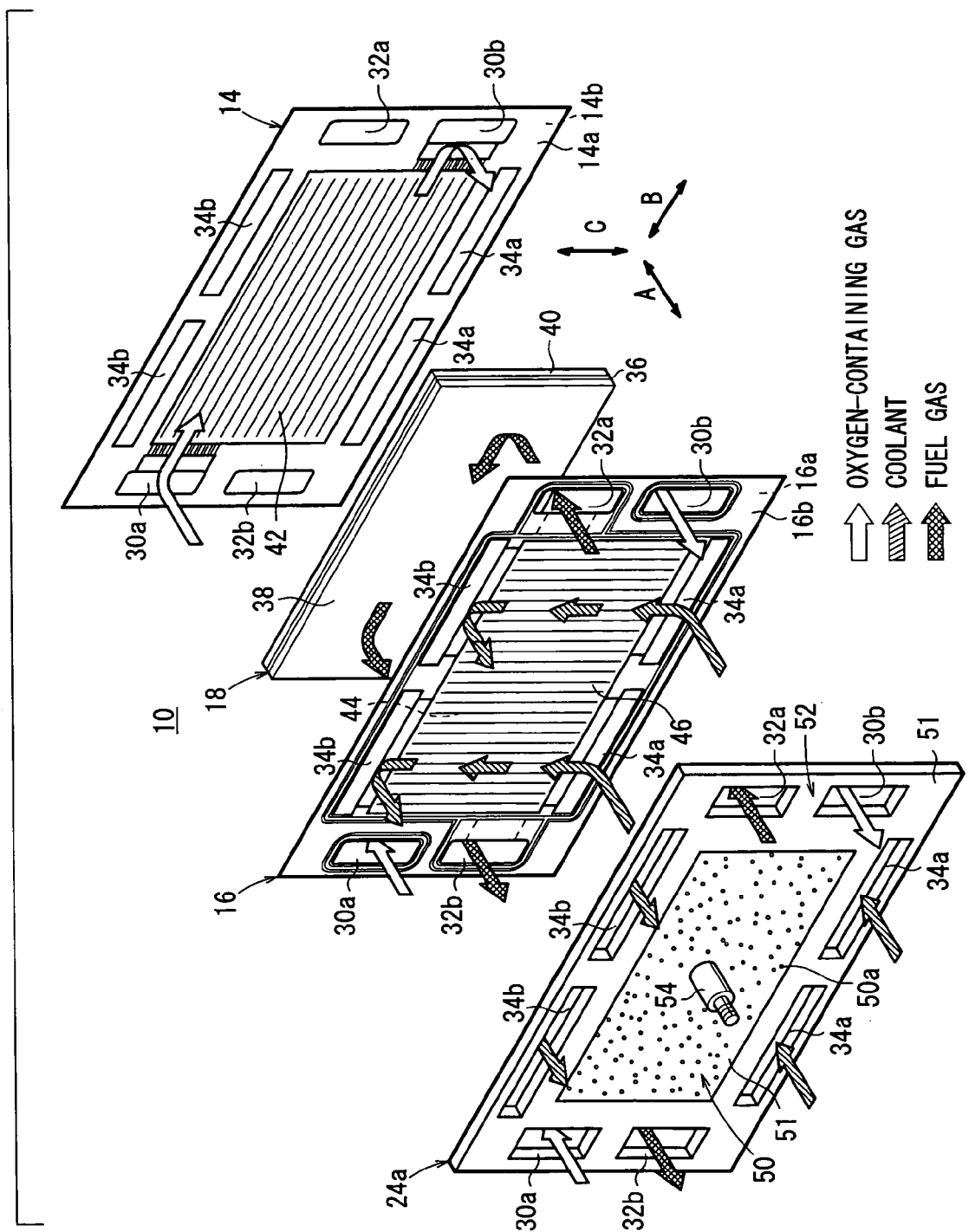
FIG. 2 is an exploded perspective view showing main components of the fuel cell.

FIG. 1 is a perspective view showing a fuel cell stack 12, partially in cross section, formed by stacking fuel cells 10 according to a first embodiment of the present invention. FIG. 2 is an exploded perspective view showing main components of the fuel cell 10.

The fuel cell 10 includes a membrane electrode assembly (electrolyte electrode assembly) 18, and first and second separators 14, 16 for sandwiching the membrane electrode assembly 18. A plurality of the fuel cells 10 are stacked together in a direction indicated by an arrow A to form a cell assembly 20. As shown in FIG. 1, terminal plates 24a, 24b are provided at opposite ends of the cell assembly 20 in the stacking direction indicated by the arrow A. Insulating plates 28a, 28b are stacked on the outside of the terminal plates 24a, 24b, respectively. Further, end plates 26a, 26b are stacked on the outside of the insulating plates 28a, 28b, respectively.

As shown in FIG. 2, at one end of the fuel cell 10 in a horizontal direction indicated by an arrow B, an oxygen-containing gas supply passage (reactant gas passage) 30a for supplying an oxygen-containing gas and a fuel gas discharge passage (reactant gas passage) 32b for discharging a fuel gas such as a hydrogen-containing gas are arranged in a vertical direction indicated by an arrow C. The oxygen-containing gas supply passage 30a and the fuel gas discharge passage 32b extend through the fuel cell 10 in the stacking direction indicated by the arrow A.

At the other end of the fuel cell 10 in the direction indicated by the arrow B, a fuel gas supply passage (reactant gas passage) 32a for supplying the fuel gas and an oxygen-containing gas discharge passage (reactant gas passage) 30b for discharging the oxygen-containing gas are arranged in the direction indicated by the arrow C. The fuel gas supply passage 32a and the oxygen-containing gas discharge passage 30b extend through the fuel cell 10 in the direction indicated by the arrow A.

At a lower end of the fuel cell 10, two coolant supply passages (coolant passage) 34a are provided for supplying a coolant. At an upper end of the fuel cell 10, two coolant discharge passages (coolant passage) 34b are provided for discharging the coolant.

The membrane electrode assembly 18 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and the cathode 40 has a gas diffusion layer, and an electrode catalyst layer of platinum alloy supported on porous carbon particles. The carbon particles of the electrode catalyst layer are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first separator 14 includes an oxygen-containing gas flow field 42 on its surface 14a facing the membrane electrode assembly 18. The oxygen-containing gas flow field 42 is connected to the oxygen-containing gas supply passage 30a at one end, and connected to the oxygen-containing gas discharge passage 30b at the other end. The oxygen-containing gas flow field 42 comprises a plurality of grooves extending in the direction indicated by the arrow B, for example.

The second separator 16 includes a fuel gas flow field 44 on its surface 16a facing the membrane electrode assembly 18. The fuel gas flow field 44 is connected to the fuel gas supply passage 32a at one end, and connected to the fuel gas discharge passage 34b at the other end. The fuel gas flow field 44 comprises a plurality of grooves extending in the direction indicated by the arrow B, for example. Further, the second separator 16 has a coolant flow field 46 on its surface 16b opposite to the surface 16a. The coolant flow field 46 is connected to the coolant supply passages 34a at one end, and connected to the coolant discharge passages 34b at the other end. The coolant flow field 46 comprises a plurality of grooves extending in the direction indicated by the arrow C.

The terminal plate 24a includes an electron conductive area 50 electrically connected to the anode 38, and a passage area 52. The oxygen-containing gas supply passage 30a, the fuel gas discharge passage 32b, the fuel gas supply passage 32a, the oxygen-containing gas discharge passage 30b, the coolant supply passages 34a, and the coolant discharge passages 34b are formed in the passage area 52.

The electron conductive area 50 of the terminal plate 24a includes porous metal such as a foamed metal 50a. For example, the foamed metal 50a is made of non-corrosive metal material with a good electrical conductivity, which is resistant to rust by water, and corrosion-free in the presence of a strong acid. For example, stainless steel, titanium, or nickel are used as the non-corrosive metal material. For example, insulating resin 51 such as thermoplastic resin or thermosetting resin is impregnated in the foamed metal 50a to form the electron conductive area 50. The passage area 52 of the terminal plate 24a is made of insulating resin 51.

The terminal plate 24a includes a terminal 54 connected to the electron conductive area 50. Electrical energy is collected from the terminal 54 to the outside. At an end of the terminal 54, a screw 54a is provided for attaching a lug terminal 56 to the screw 54a (see FIG. 1).

The terminal plate 24b has the same structure as the terminal plate 24a. The constituent elements of the terminal plate 24b that are identical to those of the terminal plate 24a are labeled with the same reference numeral, and description thereof is omitted. The insulating plates 28a, 28b have tubular members 58a, 58b for inserting the terminals 54 of the terminal plates 24a, 24b, respectively.

Next, a method of producing the terminal plate 24a of the fuel cell stack 12 according to the first embodiment of the present invention will be described.

Figure 3:
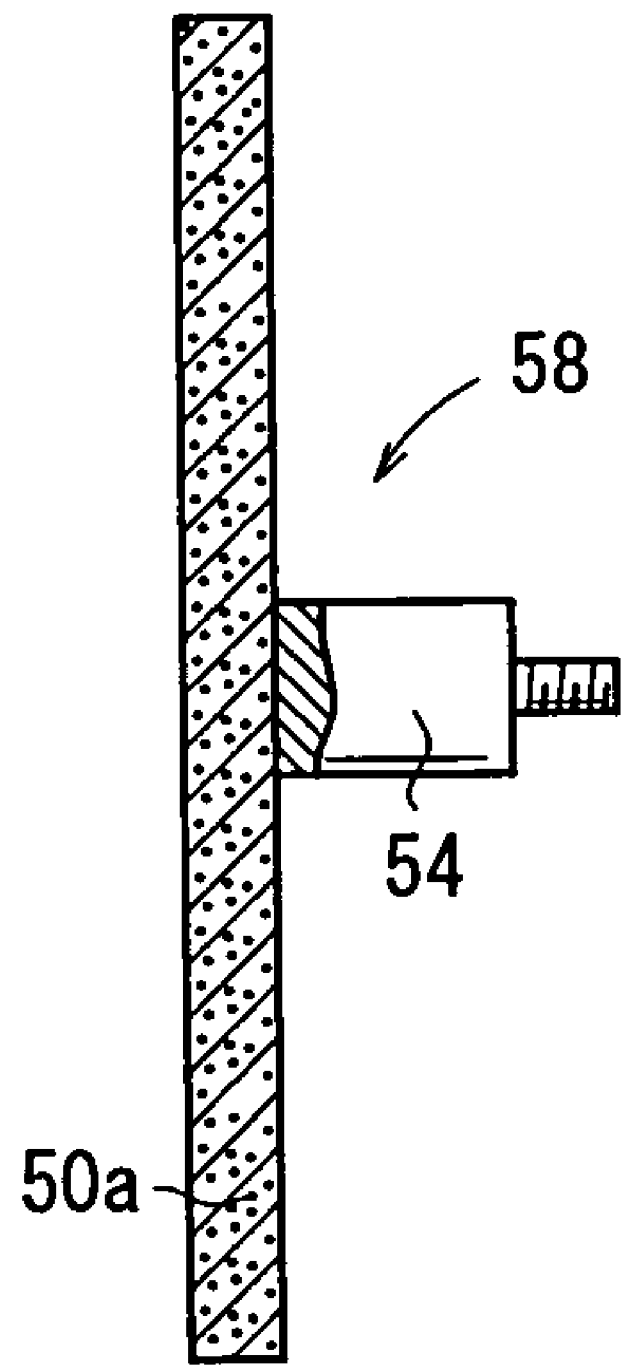
FIG. 3 is a side view showing a joint body.

As shown in FIG. 3, the foamed metal 50a having dimensions corresponding to the membrane electrode assembly 18 shown in FIG. 2 and the terminal 54 are prepared. Interfaces between the foamed metal 50a and the terminal 54 are jointed by brazing or by diffusing bonding to form a joint body 58.

Figure 4:
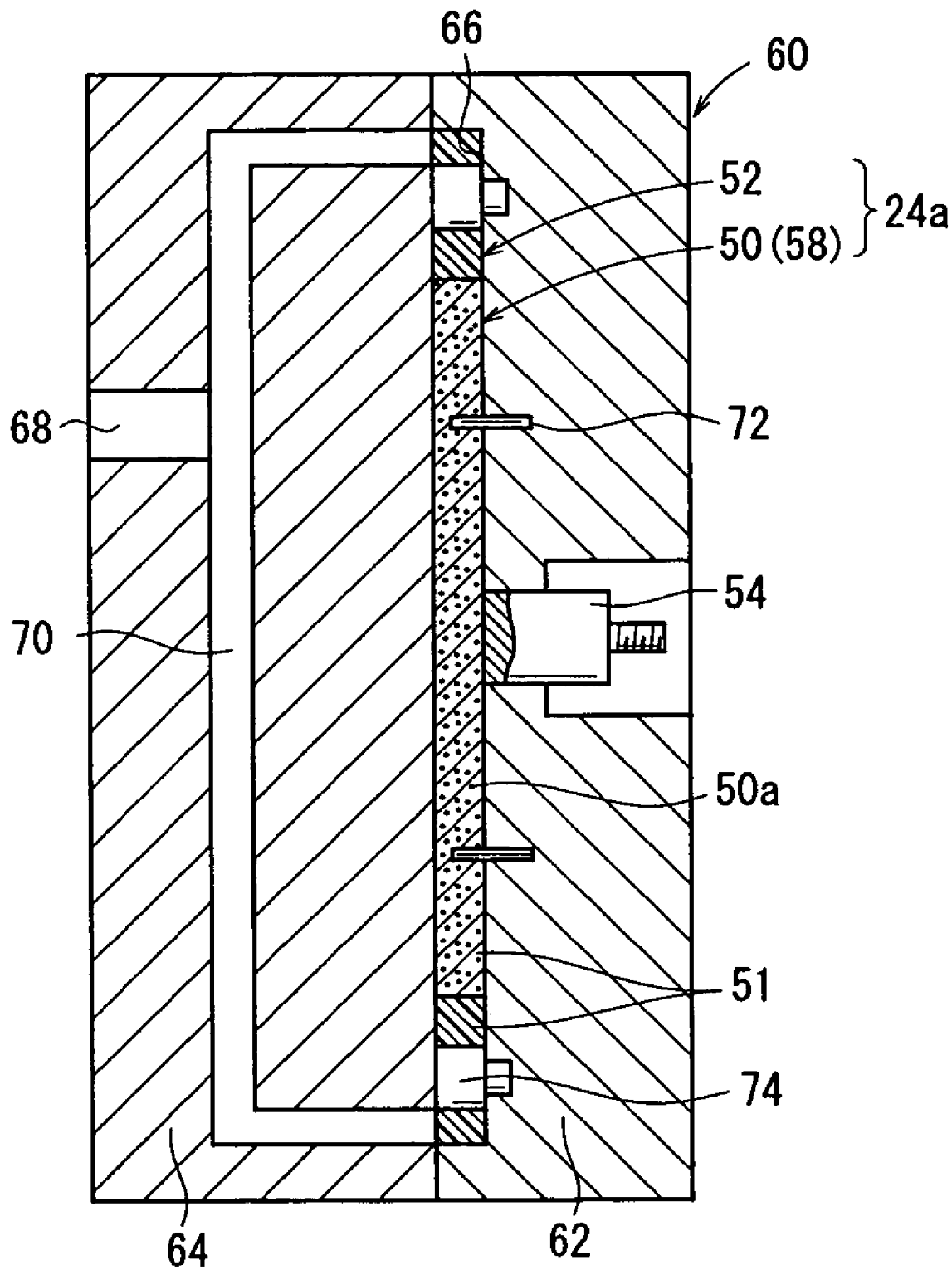
FIG. 4 is a cross sectional view showing an injection molding machine.

As shown in FIG. 4, the joint body 58 is installed in an injection molding machine 60. The injection molding machine 60 includes a first die 62 and a second die 64. A cavity 66 is formed between the first and second dies 62, 64. The cavity 66 has a shape corresponding to a shape of the terminal plate 24a. A resin inlet 68 and a passage 70 for injecting the insulating resin 51 into the cavity 66 is formed in the second die 64.

In the injection molding machine 60, when the first and second dies 62, 64 are opened, the joint body 58 is placed in the first die 62 using positioning pins 72. A plurality of bosses (cores) 74 are provided in the cavity 66 for forming the oxygen-containing gas supply passage 30a, the fuel gas discharge passage 32b, the fuel gas supply passage 32a, the oxygen-containing gas discharge passage 30b, the coolant supply passages 34a, and the coolant discharge passages 34b.

When the first and the second dies 62, 64 are closed, the insulating resin 51 is injected from the resin inlet 68. The insulating resin 51 flows through the passage 70, and is filled in the cavity 66. Thus, the electron conductive area 50 of a composite including different materials is produced by impregnating the foamed metal 50a with the insulating resin 51, and the passage area 52 of the insulating resin 51 is produced. The electron conductive area 50 and the passage area 52 are molded together to form the terminal plate 24a.

The terminal plate 24b is produced in the same manner as the terminal plate 24a, and description thereof is omitted.

Next, operation of the fuel cell 10 will be described.

As shown in FIG. 2, an oxygen-containing gas is supplied to the oxygen-containing gas supply passage 30a, and a fuel gas such as a hydrogen-containing gas is supplied to the fuel gas supply passage 32a. Further, a coolant such as pure water, an ethylene glycol or an oil is supplied to the coolant supply passages 34a.

The oxygen-containing gas flows from the oxygen-containing gas supply passage 30a into the oxygen-containing gas flow field 42 formed on the first separator 14, and flows along the cathode 40 of the membrane electrode assembly 18 to induce an electrochemical reaction at the cathode 40. The fuel gas flows from the fuel gas supply passage 32a into the fuel gas flow field 44, and flows along the anode 38 of the membrane electrode assembly 18 to induce an electrochemical reaction at the anode 38.

In the membrane electrode assembly 18, the oxygen-containing gas supplied to the cathode 40, and the fuel gas supplied to the anode 38 are consumed in the electrochemical reactions at the electrode catalyst layers of the cathode 40 and the anode 38 for generating electricity.

After the oxygen-containing gas is consumed at the cathode 40, the oxygen-containing gas is discharged into the oxygen-containing gas discharge passage 30b, and flows in the direction indicated by the arrow A. Similarly, after the fuel gas is consumed at the anode 38, the fuel gas is discharged into the fuel gas discharge passage 32b, and flows in the direction indicated by the arrow A.

The coolant flows from the coolant supply passages 34a into the coolant flow field 46 between the first separator 14 and the second separator 16, and flows vertically (upwardly). After the coolant is used for cooling the membrane electrode assembly 18, the coolant is discharged into the coolant discharge passages 34b.

In the first embodiment, the terminal plate 24a includes the electron conductive area 50 and the passage area 52. The electron conductive area 50 is made of a composite of the foamed metal 50a and the insulating resin 51. The passage area 52 is made of the insulating resin 51. Thus, the amount of metal used in the terminal plate 24a is small, and the terminal plate 24a has a lightweight.

For example, if a conventional terminal plate 24a which is made only of copper (specific gravity=8.96 g/cm$^3$) has a thickness of 3 mm, a width of 200 mm, and a length of 300 mm, the weight of the terminal plate 24a is 1612 g.

In an example of the first embodiment, the power generation area of the terminal plate 24a is made of the foamed metal 50a having a porosity of 70%, and has a thickness of 3 mm, a width of 140 mm, and a length of 220 mm. The remaining area of the terminal plate 24a is made of resin (specific gravity=2 g/cm$^3$). The weight of the terminal plate 24a according to the first embodiment of the present invention is 553 g. Thus, weight reduction of about 1000 g is achieved in the terminal plate 24a according to the first embodiment in comparison with the conventional structure.

Humidified gas or water produced in the electrochemical reaction is likely to be trapped in the oxygen-containing gas supply passage 30a, the oxygen-containing gas discharge passage 30b, the fuel gas supply passage 32a, and the fuel gas discharge passage 32b. Further, if impurities are mixed into the coolant, the ion conductivity of the coolant may be increased.

In the first embodiment, the passage area 52 is made of the insulating resin 51 without using metal. Therefore, no corrosions or elusions occur in the passage area 52. Thus, it is not required to provide any grommets or insulating coating around the fluid passages. With the simple structure, the terminal plate 24a is produced easily at a low cost.

In the first embodiment, as shown in FIG. 3, the terminal 54 is connected to the foamed metal 50a by brazing or by diffusing bonding. Thus, it is possible to connect a large number of contact points on the connecting surfaces of the foamed metal 50a and the terminal 54 to effectively reduce the electrical resistance between the foamed metal 50a and the terminal 54. Alternatively, the foamed metal 50a and the terminal 54 are connected by electron beam welding or laser welding for limiting raise of temperature at a local point. Thus, the thermal deformation can be minimized.

In the first embodiment, the joint body 58 is placed in the injection molding machine 60, and the foamed metal 50a is impregnated with the insulating resin 51. The passage area 52 made only of the insulating resin 51 is formed around the bosses 74. The injection molding and resin impregnation molding are effective in filling the insulating resin 51 into pores of the foamed metal 50a in comparison with heat compression molding using resin pellets. With the simple production process, it is possible to produce the terminal plate 24a of the desired quality easily at a low cost. The time needed for molding is reduced dramatically, and the production of the terminal plate 24a is carried out efficiently.

Figure 5:
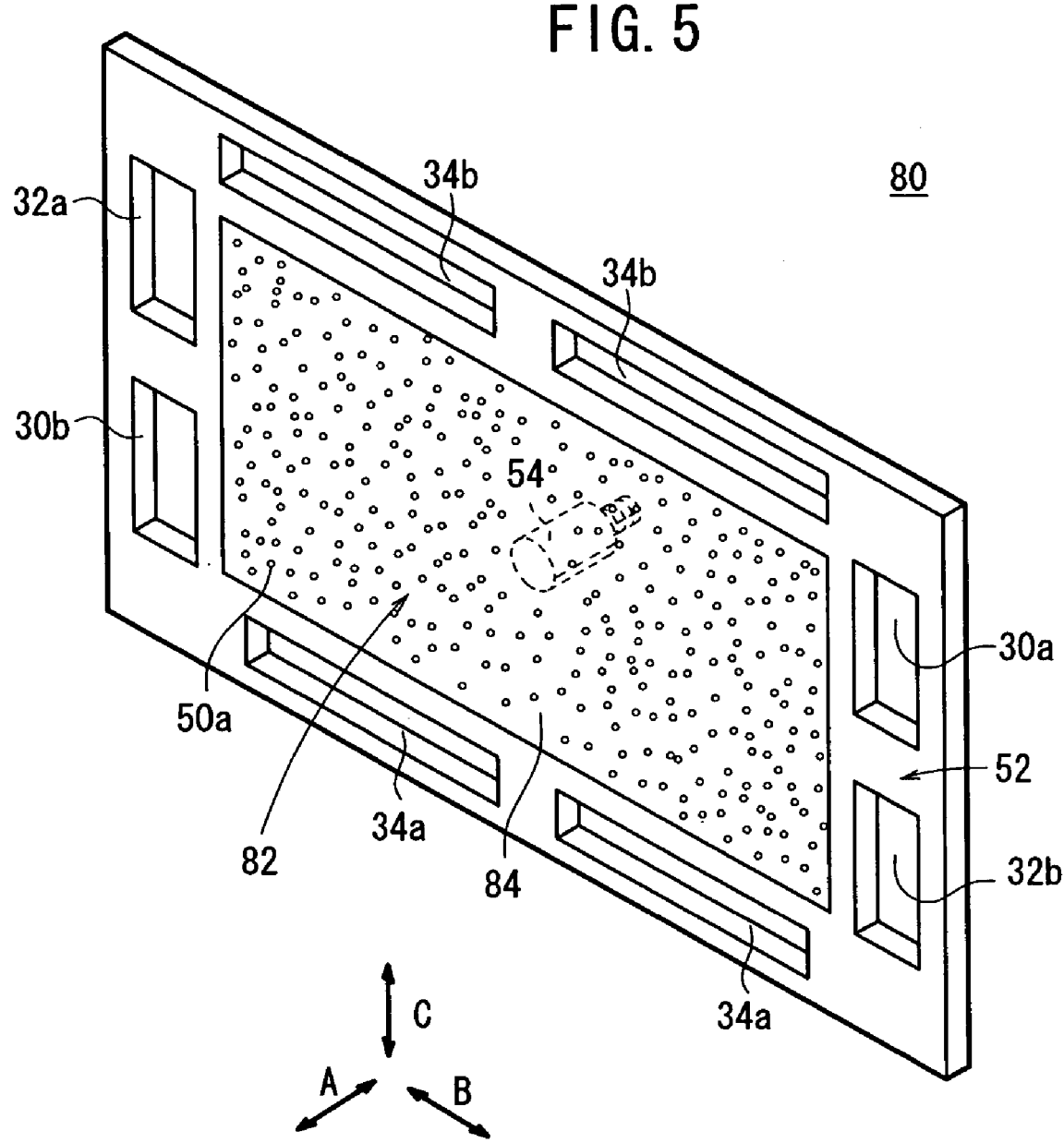
FIG. 5 is a perspective view showing a terminal plate of a fuel cell stack according to a second embodiment of the present invention.

FIG. 5 is a perspective view schematically showing a terminal plate 80 of a fuel cell stack according to a second embodiment of the present invention. The constituent elements that are identical to those shown of the terminal plate 24a of the fuel cell stack 12 according to the first embodiment are labeled with the same reference numeral, and description thereof is omitted. Likewise, in third through eights embodiments as described later, constituent elements that are identical to those shown of the terminal plate 24a of the fuel cell stack 12 according to the first embodiment are labeled with the same reference numeral, and description thereof is omitted.

The terminal plate 80 includes an electron conductive area 82 and a passage area 52. A surface of the electron conductive area in contact with a separator (not shown) is cut away such that the metal surface of the foamed metal 50a is exposed. Then, the exposed metal surface is electroplated. Specifically, the metal surface of the foamed metal 50a is covered by a conductive coating material 84 such as gold, platinum, or a metal which is not oxidized easily.

In the second embodiment, since it is not required to coat the entire surface of the terminal plate 80, the amount of noble metal used for coating is small, and the contact resistance is small. The terminal plate 80 is economical.

Figure 6:
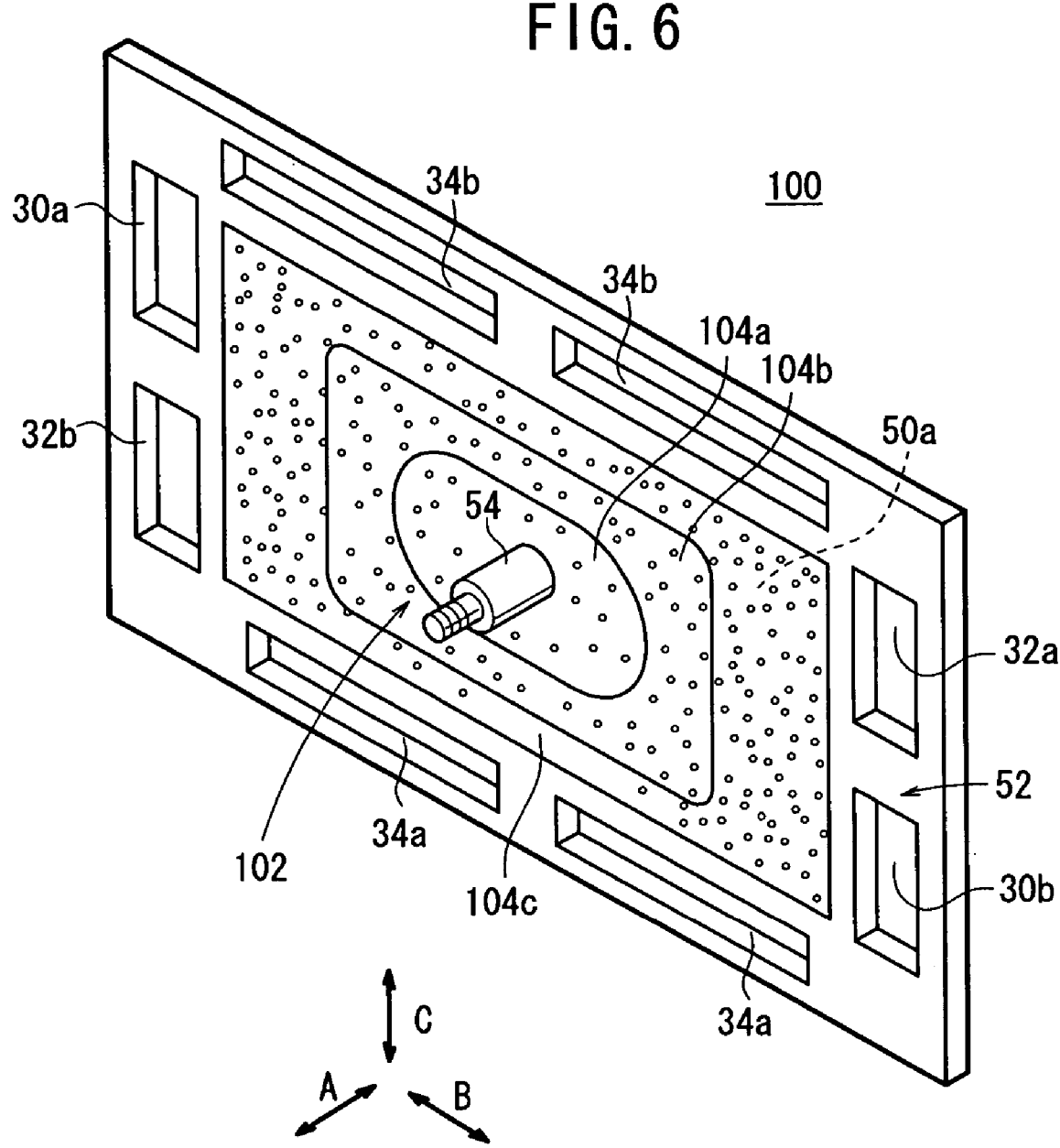
FIG. 6 is a perspective view showing a terminal plate of a fuel cell stack according to a third embodiment of the present invention.

FIG. 6 is a perspective view showing a terminal plate 100 of a fuel cell stack according to a third embodiment of the present invention.

The terminal plate 100 includes an electron conductive area 102 and a passage area 52. Metal density in the electron conductive area 102 changes such that the electron conductive area 102 has a high metal density at a position close to the terminal 54, and has a low metal density at a position away from the terminal 54. For example, a low porosity region 104a having a porosity of 30% is provided centrally in the electron conductive area 102 where the terminal 54 is connected. Further, an intermediate porosity region 104b having a porosity of 60% is provided around the low porosity region 104a, and a high porosity region 104c having a porosity of 90% is provided around the intermediate porosity region 104b.

The electron conductive area 102 including the regions of different metal densities can be produced in various methods described below.

Figure 7A:
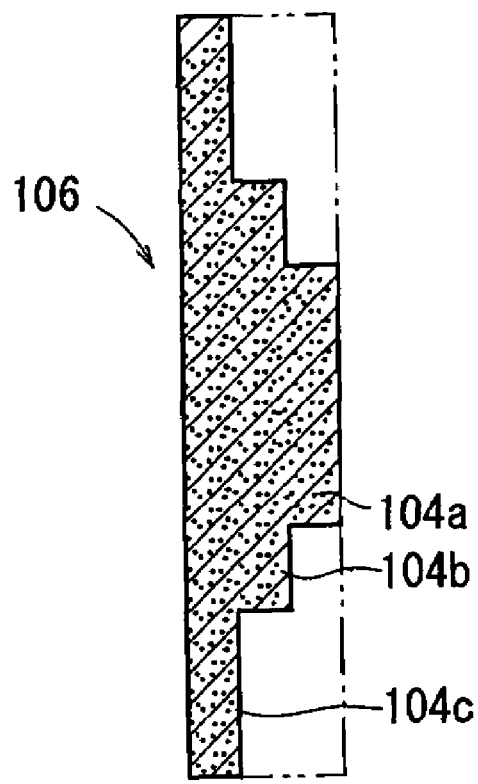
FIG. 7A and FIG. 7B are views showing a first method of producing a foamed metal.

According to a first method, as shown in FIG. 7A, a uniform foamed metal 106 is machined into a shape having different thicknesses, corresponding to the low porosity region 104a, the intermediate porosity region 104b, and the high porosity region 104c.

Figure 7B:
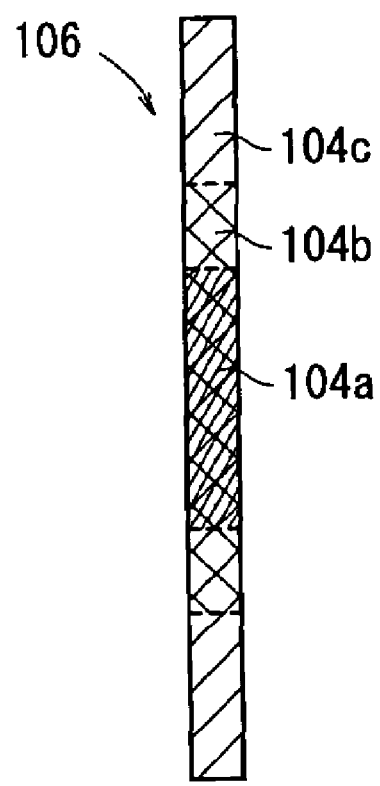

Then, the foamed metal 106 is placed into the injection molding machine 60. The foamed metal 106 may be compressed into a plate shape, and then, placed into the injection molding machine 60 (see FIG. 7B). By injection molding using the insulating resin 51, the terminal plate 100 including the electron conductive area 102 and the passage area 52 is produced.

Figure 8A:
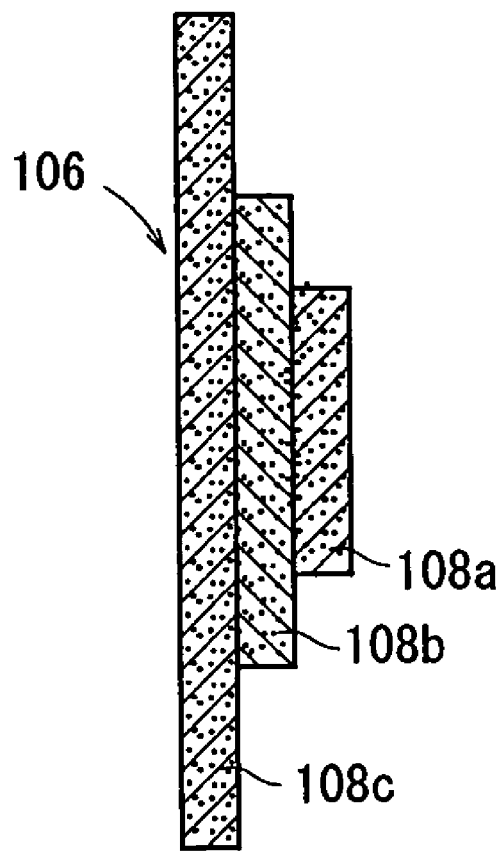
FIG. 8A and FIG. 8B are views showing a second method of producing the foamed metal.

According to a second method, as shown in FIG. 8A, a uniform foamed metal 108a corresponding to the high porosity region 104a, a uniform foamed metal 108b corresponding to the foamed metal 104b, and a uniform foamed metal 108c corresponding to the low porosity region 104c are used.

Figure 8B:
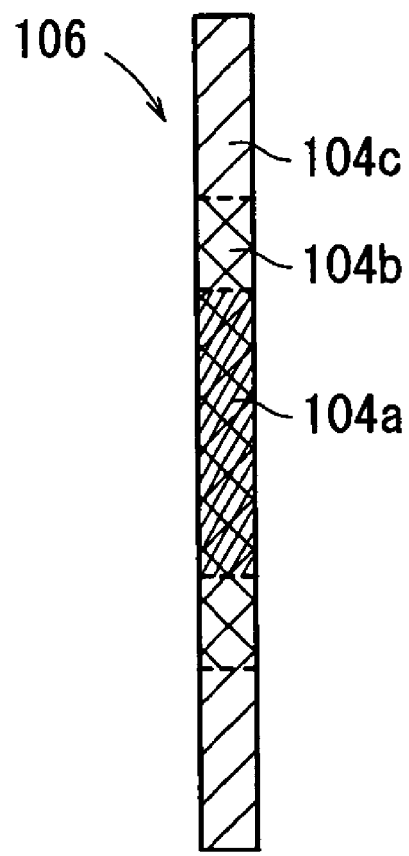

Interfaces of the foamed metals 108a through 108c are jointed, for example, by diffusion bonding, to produce a single foamed metal 106. Then, the foamed metal 106 is placed into the injection molding machine 60. The foamed metal 106 may be compressed into a plate shape, and then, placed into the injection molding machine 60 (see FIG. 8B). By injection molding using the insulating resin 51, the terminal plate 100 including the electron conductive area 102 and the passage area 52 is produced.

Figure 9:
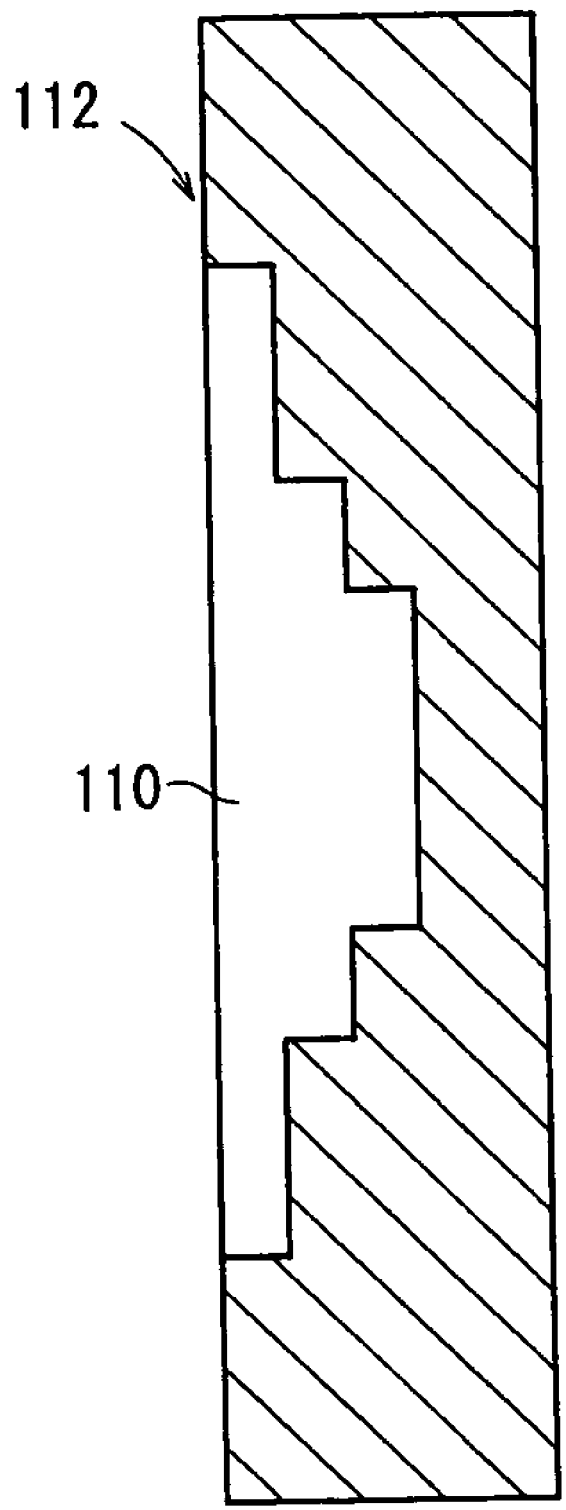
FIG. 9 is a view showing a third method of producing the foamed metal.
Figure 10:
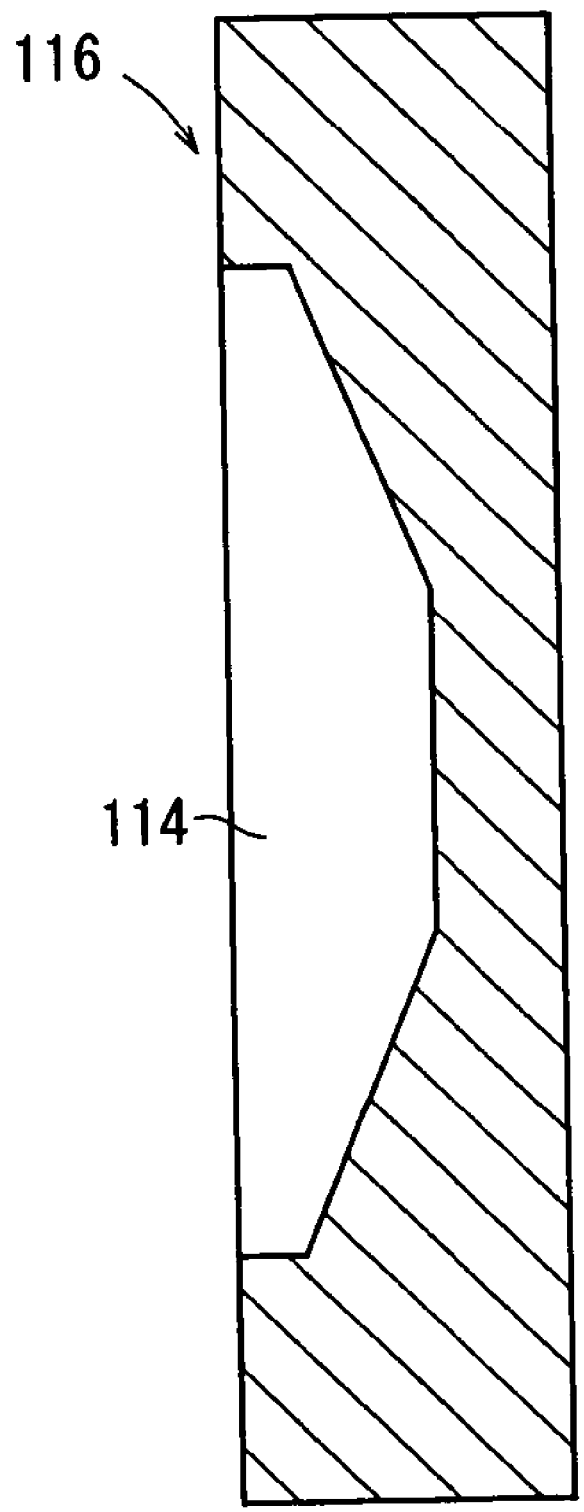
FIG. 10 is a view showing a fourth method of producing the foamed metal.

According to a third method, as shown in FIG. 9, a die 112 having a stepped cavity 110 is used for molding the foamed metal. According to a fourth method, as shown in FIG. 10, a die 116 having a sloped cavity 114 is used for molding the foamed metal. According to a fifth method, a foamed metal having different porosities is used for molding.

In the third embodiment, metal density in the electron conductive area 102 changes such that metal density increases as it gets closer to the terminal 54. Therefore, electrical resistance is not large near the terminal 54 where electrical current is concentrated. Thus, it is possible to prevent excessive heat generation near the terminal 54. The amount of metal used near the terminal 54 is optimized according to the amount of electric current flowing into the terminal 54. Since the metal is used as needed, by changing metal density depending on the positions in the electron conductive area 102, it is possible to effectively reduce the overall amount of metal used in the electron conductive area 102. Thus, the foamed metal has a lightweight in comparison with the foamed metal having a uniform metal density. Since the uniform foamed metal may be used to produce the foamed metal 106 having different metal densities, the foamed metal 106 can be produced simply at a low cost.

Figure 11:
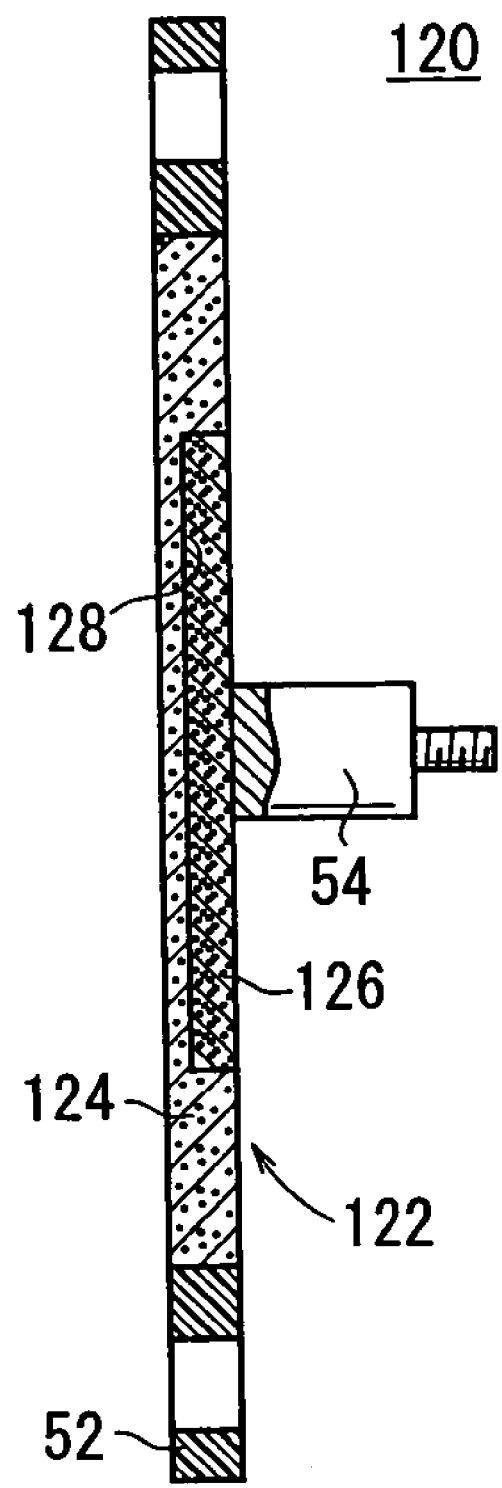
FIG. 11 is a cross-sectional view showing a terminal plate of a fuel cell stack according to a fourth embodiment of the present invention.

FIG. 11 is a cross sectional view showing a terminal plate 120 of a fuel cell stack according to a fourth embodiment of the present invention.

The terminal plate 120 includes an electron conductive area 122 and a passage area 52. Metal density in the electron conductive area 122 changes such that the electron conductive area has a high metal density at a position close to the terminal 54, and has a low metal density at a position away from the terminal 54. Specifically, a first foamed metal 124 having a porosity of 90% and a second foamed metal 126 having a porosity of 40% are used in the electron conductive area 122. A recess 128 is formed centrally in the first foamed metal 124.

The second foamed metal 126 is provided in the recess 128 of the first foamed metal 124 by diffusion bonding, for example. Therefore, the terminal plate 120 has a uniform thickness over the entire electron conductive area 122. The terminal 54 is connected to a central region of the second foamed metal 126 before the second foamed metal 126 is provided in the first foamed metal 124.

Thus, in the fourth embodiment, electrical resistance near the terminal 54 is reduced. As with the third embodiment, the fourth embodiment is advantageous in that excessive heat generation or the like does not occur near the terminal 54. The first and second foamed metals 124, 126 may be compressed into a plate shape under pressure to produce the electron conductive area 122.

Figure 12:
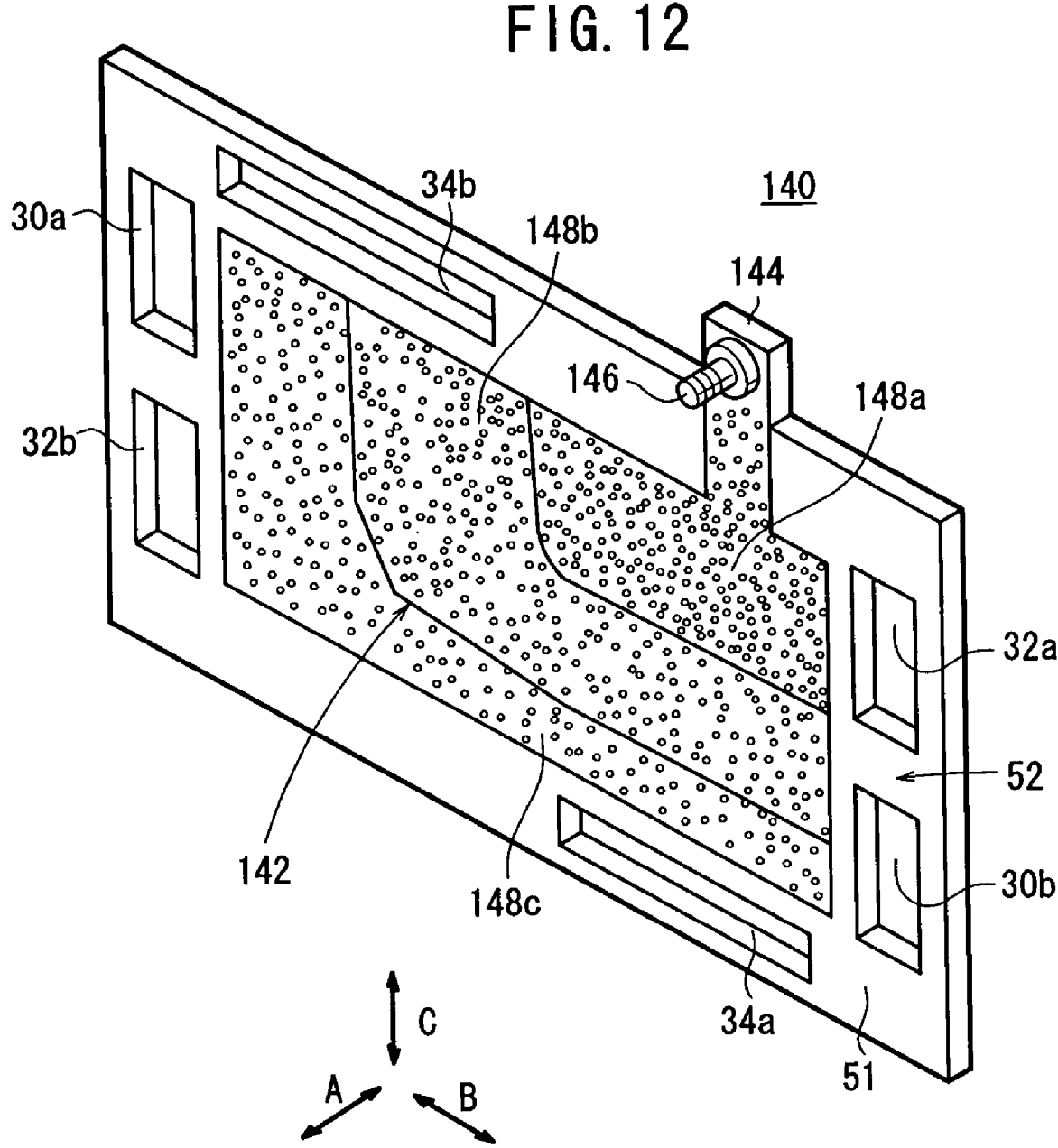
FIG. 12 is a cross-sectional view showing a terminal plate of a fuel cell stack according to a fifth embodiment of the present invention.

FIG. 12 is a perspective view showing a terminal plate 140 of a fuel cell stack according to a fifth embodiment of the present invention.

The terminal plate 140 includes an electron conductive area 142 and a passage area 52. As shown in FIG. 12, the electron conductive area includes an extension plate 144 extending upwardly. A terminal 146 is connected to the extension plate 144.

The electron conductive area 142 includes a low porosity region 148a having a porosity of 30% near the terminal 146. An intermediate porosity region 148b having a porosity of 60% is provided around the low porosity region 148a, and a high porosity region 148c having a porosity of 90% is provided around the intermediate porosity region 148b, for example.

As described above, in the fifth embodiment, the terminal 146 is connected to the extension plate 144 extending upwardly in the electron conductive area 142. In the electron conductive area 142, the porosity near the terminal 146 is low, and thus, the metal density near the terminal 146 is high. The fifth embodiment is advantageous as with the third and fourth embodiments.

Figure 13:
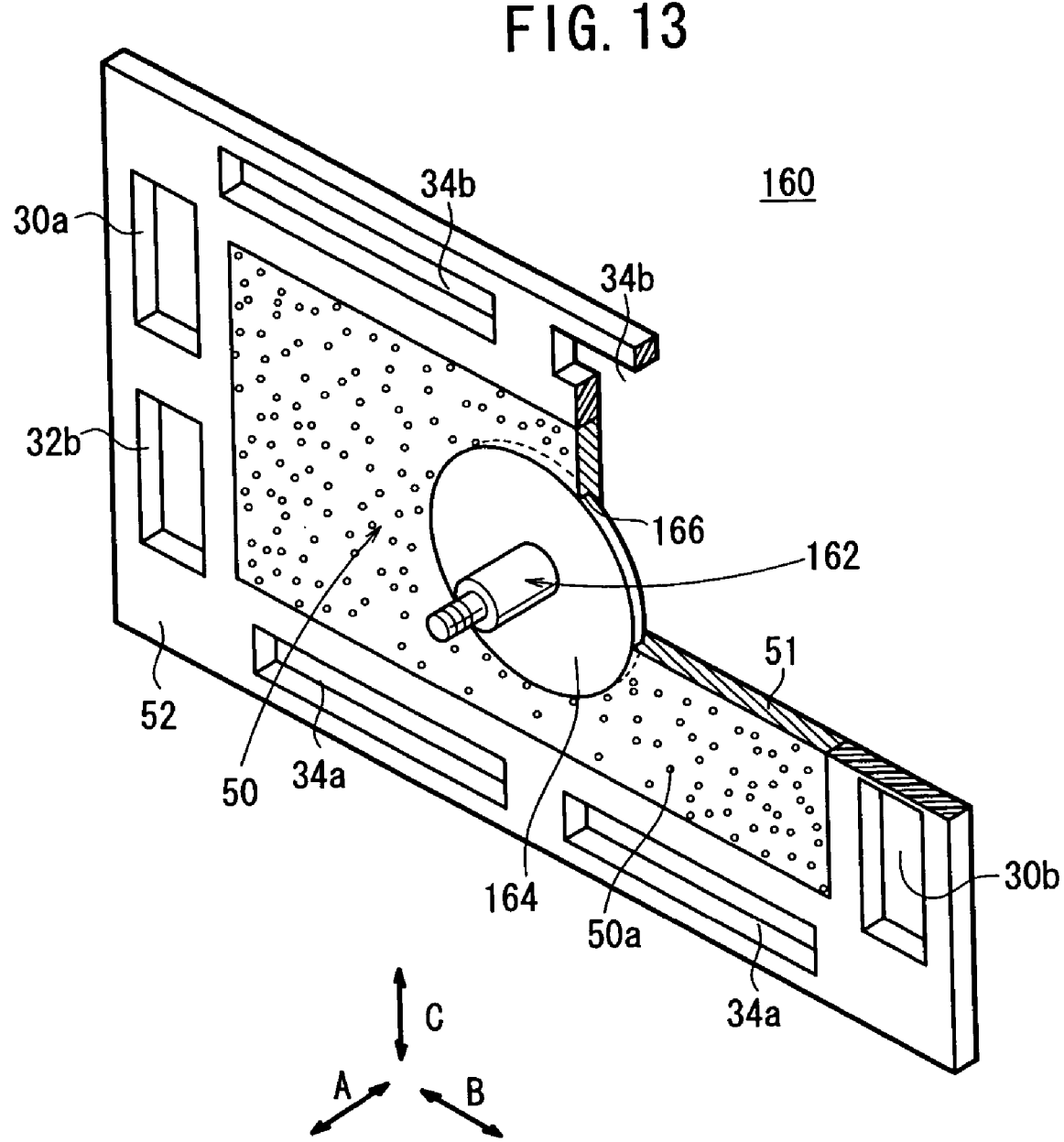
FIG. 13 is a perspective view, with a partial cutaway, of a terminal plate of a fuel cell stack according to a sixth embodiment of the present invention.

FIG. 13 is a perspective view, with a partial cutaway, showing a terminal plate 160 of a fuel cell stack according to a sixth embodiment of the present invention.

The terminal plate 160 includes a terminal 162 connected to an electron conductive area 50. The terminal 162 includes a disk-shaped portion 164 provided along a surface of the electron conductive area 50. The disk-shaped portion 164 is provided in a disk-shaped recess 166 of the electron conductive area 50, for example, by diffusion bonding.

In the sixth embodiment, the terminal 162 and the electron conductive area 50 are combined together to effectively enhance the rigidity, and improve efficiency in collecting electricity. The thickness of the foamed metal 50a is thin. Thus, the terminal plate 160 is compact, and produced at a low cost.

Figure 14:
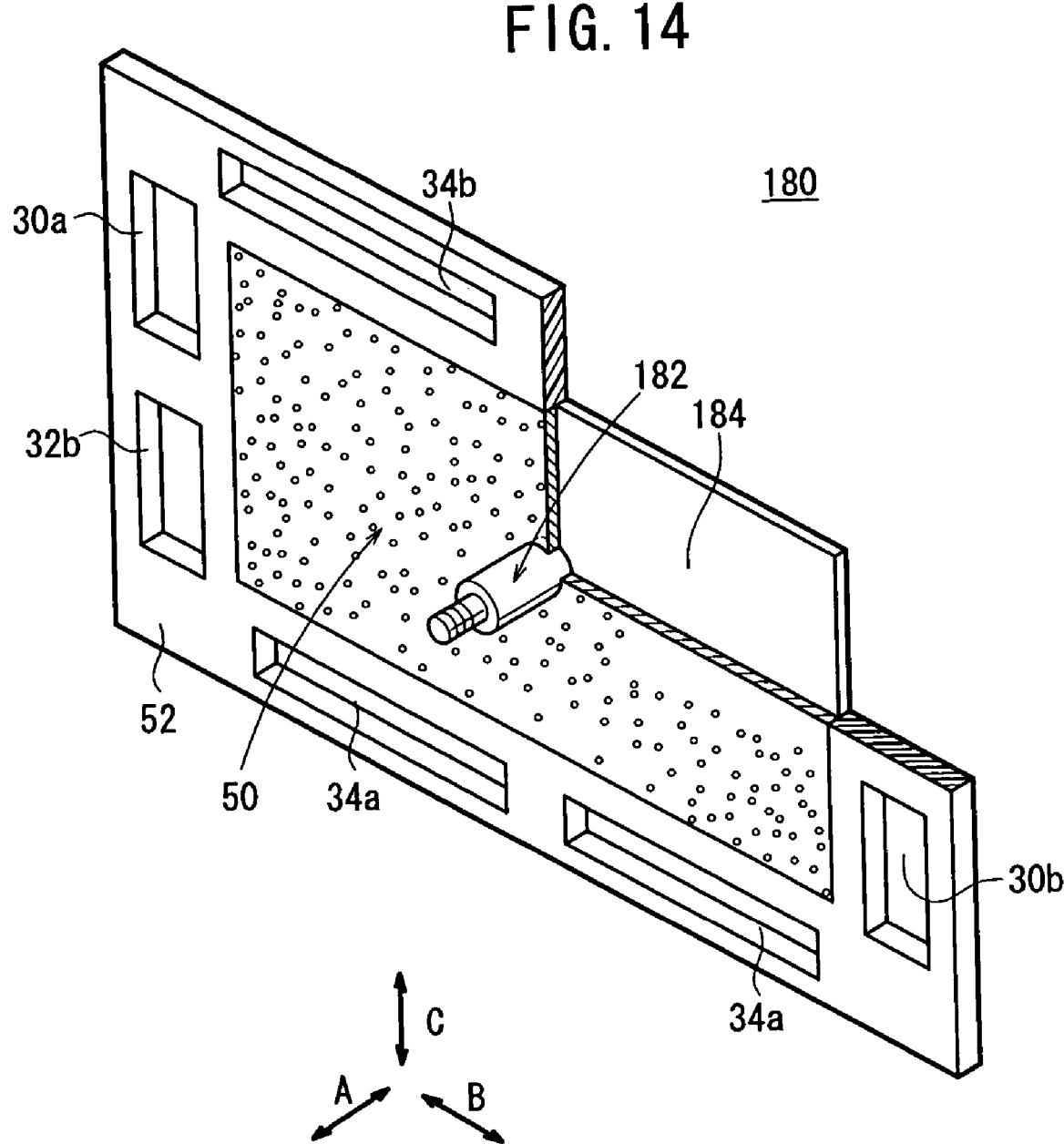
FIG. 14 is a perspective view, with a partial cutaway, of a terminal plate of a fuel cell stack according to a seventh embodiment of the present invention.

FIG. 14 is a perspective view, with a partial cut away, showing a terminal plate 180 of a fuel cell stack according to a seventh embodiment of the present invention.

The terminal plate 180 includes a terminal 182, and a planar plate 184 of the terminal 182 is in contact with the separator. The planar plate 184 and the electron conductive area 50 have the same size. The planar plate 184 is jointed to the electron conductive area 50. Thus, the planar plate 184, the electron conductive area 50, and the passage area 52 are combined together to form the terminal plate 180.

In the seventh embodiment, the planar portion (metal plate) 184 is in contact with the separator to reduce the contact resistance. The terminal plate 180 has a lightweight.

Figure 15:
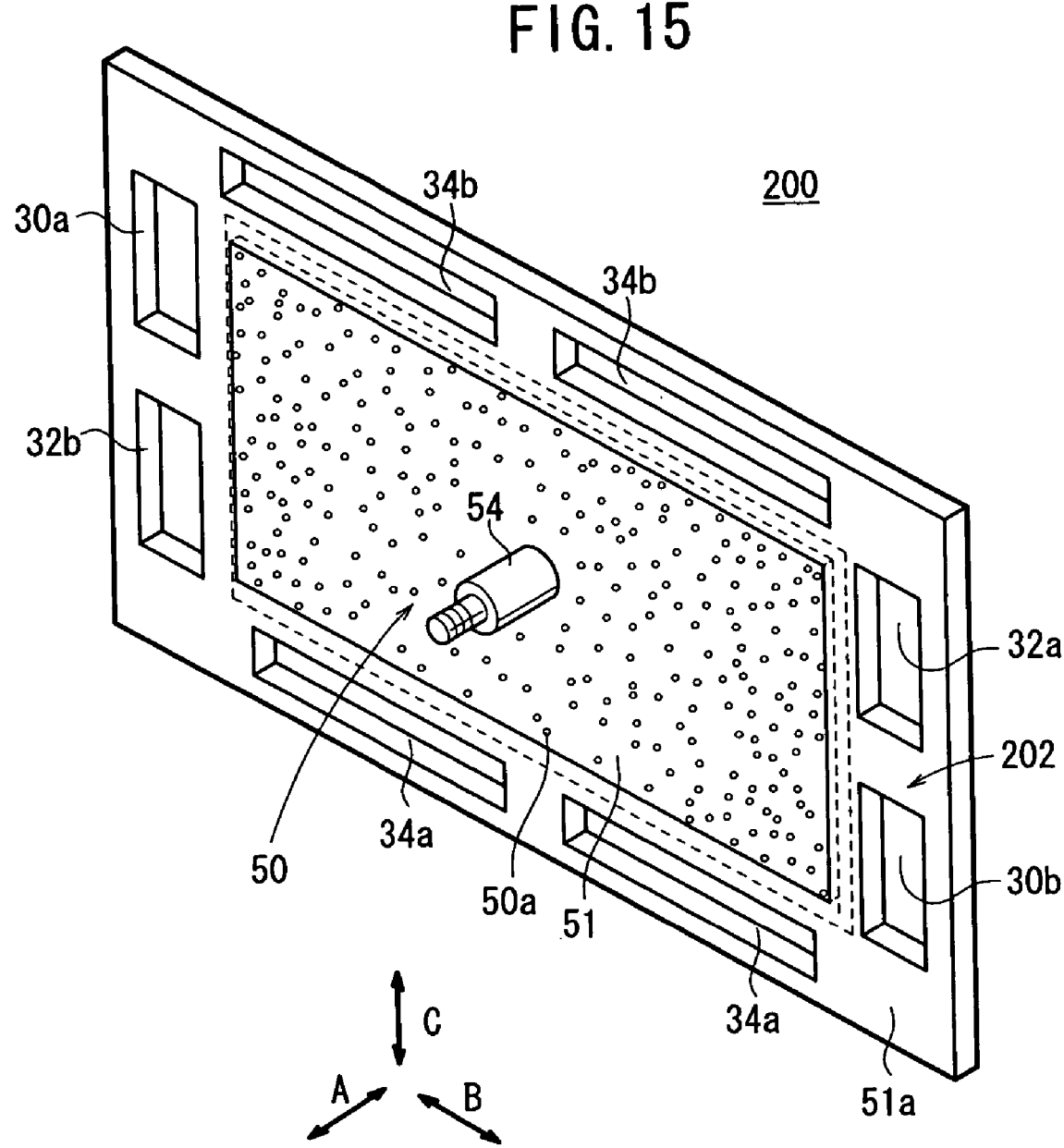
FIG. 15 is a perspective view showing a terminal plate of a fuel cell stack according to an eighth embodiment of the present invention.

FIG. 15 is a perspective view showing a terminal plate 200 of a fuel cell stack according to an eighth embodiment of the present invention.

The terminal plate 200 includes an electron conductive area 50 and a passage area 202. The electron conductive area 50 is produced separately from the passage area 202, and then, jointed to the passage area 202. The electron conductive area 50 is made of a composite which is obtained by impregnating a foamed metal 50a with insulating resin 51. The passage area 202 is made of insulating resin 51a which is different from the insulating resin 51 of the electron conductive area 50. For example, resin combined with a seal, resin which does not absorb much water, or resin which is reinforced by a glass fiber may be used as the insulating resin 51a of the passage area 202.

Figure 16:
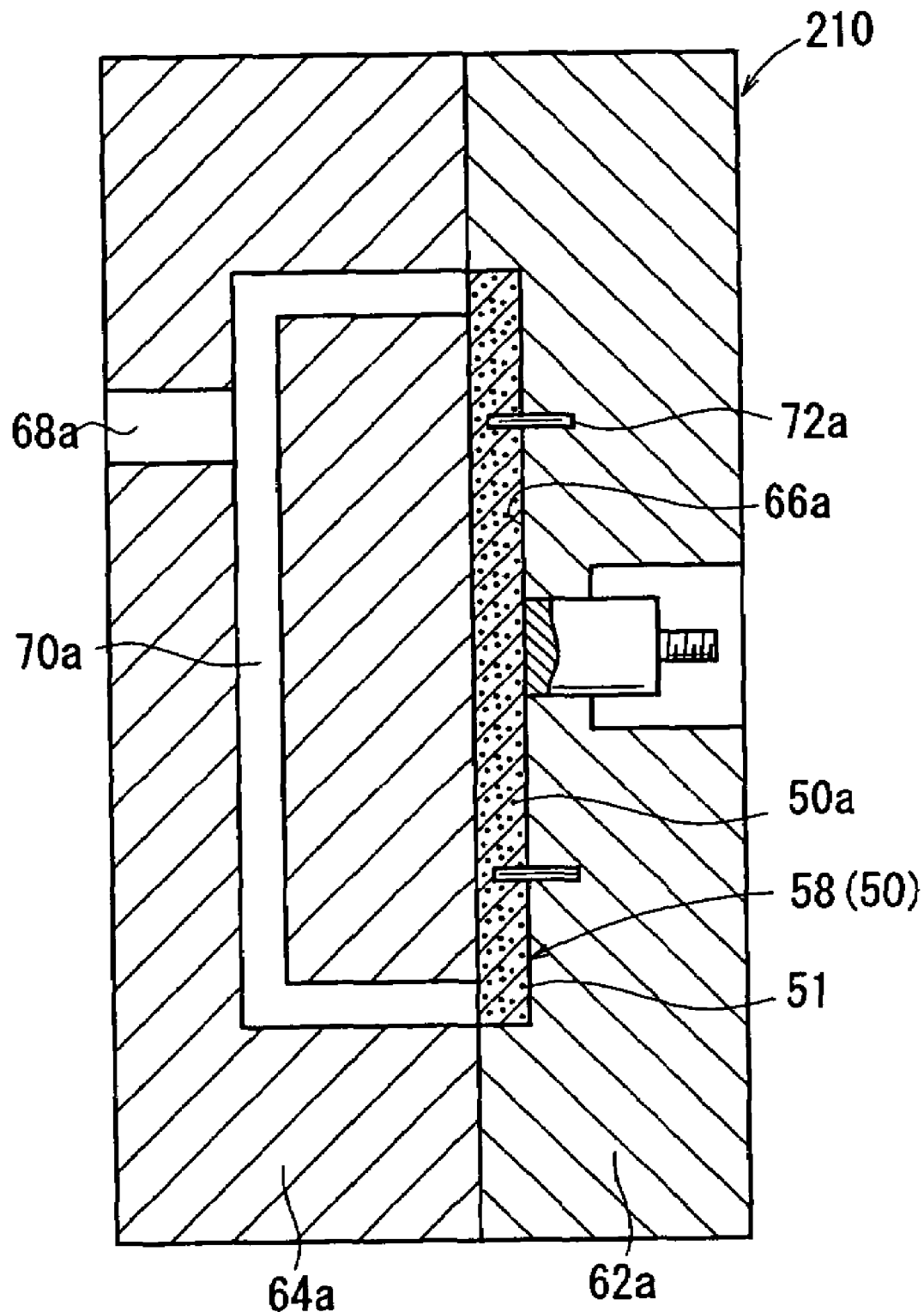
FIG. 16 is a cross sectional view showing a first injection molding machine.
Figure 17:
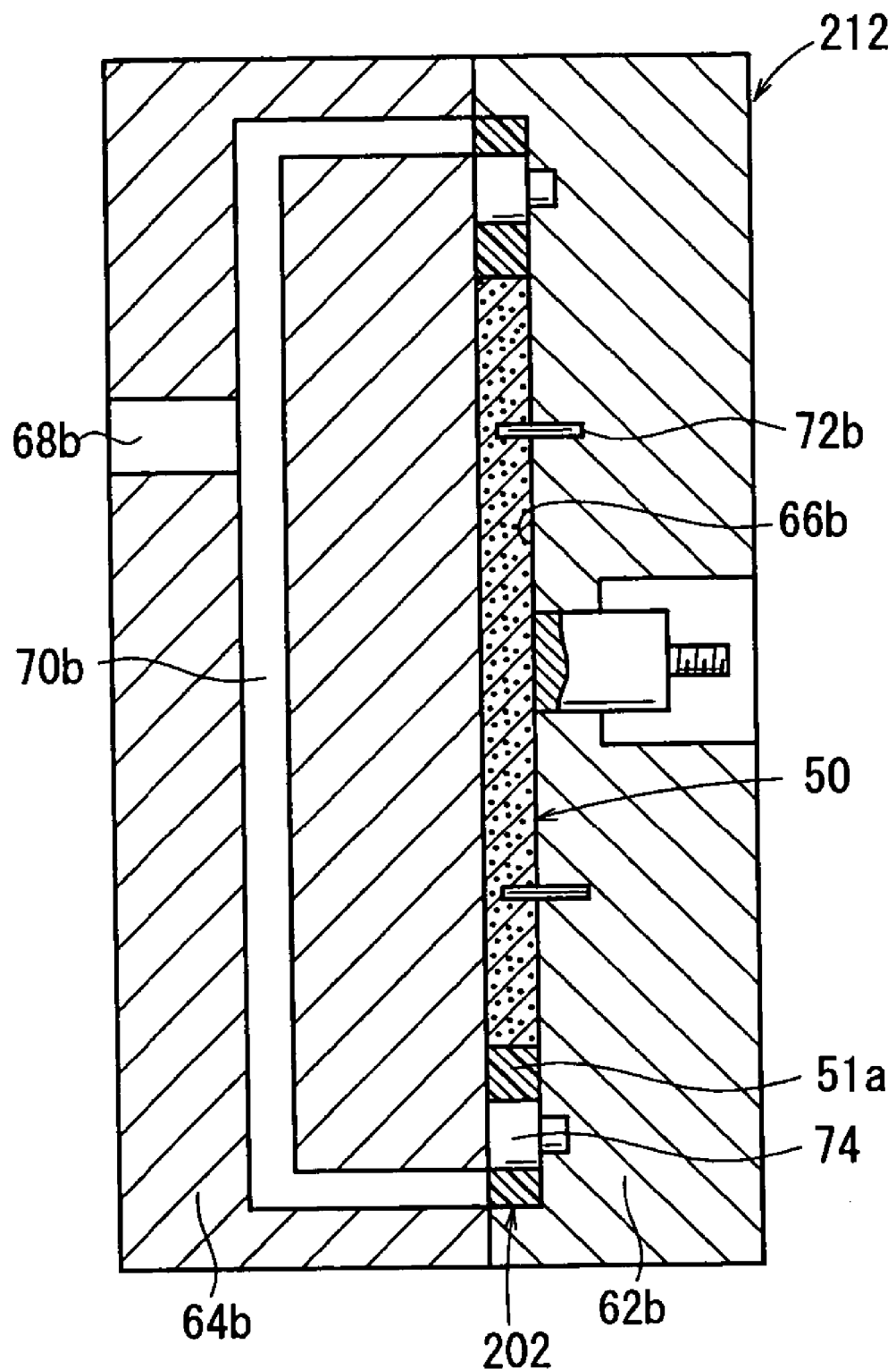
FIG. 17 is a cross sectional view showing a second injection molding machine.

FIG. 16 is a cross sectional view showing a first injection molding machine 210 for producing the electron conductive area 50, and FIG. 17 is a cross sectional view showing a second injection molding machine 212 for producing the passage area 202 around the electron conductive area 50.

Firstly, when first and second dies 62a, 64a of a first injection molding machine 210 as shown in FIG. 16 are opened, positioned away from each other, a joint body 58 is placed in a cavity 66a of the first die 62a using positioning pins 72a. After the first and second dies 62a, 64a are closed to contact with each other, insulating resin 51 is injected into the resin inlet 68a for impregnating the foamed metal 50a with the insulating resin 51 to form the electron conductive area 50.

Then, the electron conductive area 50 is taken out from the first injection molding machine 210, and transferred to the second injection molding machine 212. When first and second dies 62b, 64b are opened, positioned away from each other, the electron conductive area 50 is placed in a cavity 66b of the first die 62b using positioning pins 72b.

Bosses 74 for forming fluid passages are provided in the cavity 66b. After first and second dies 62b, 64b are closed to contact with each other, insulating resin 51a is injected into the cavity 66b. The insulating resin 51a is molded around the electron conductive area 50 to form the passage area 202. Thus, the terminal plate 200 including the electron conductive area 50 and the passage area 202 is produced as shown FIG. 15.

Figure 18:
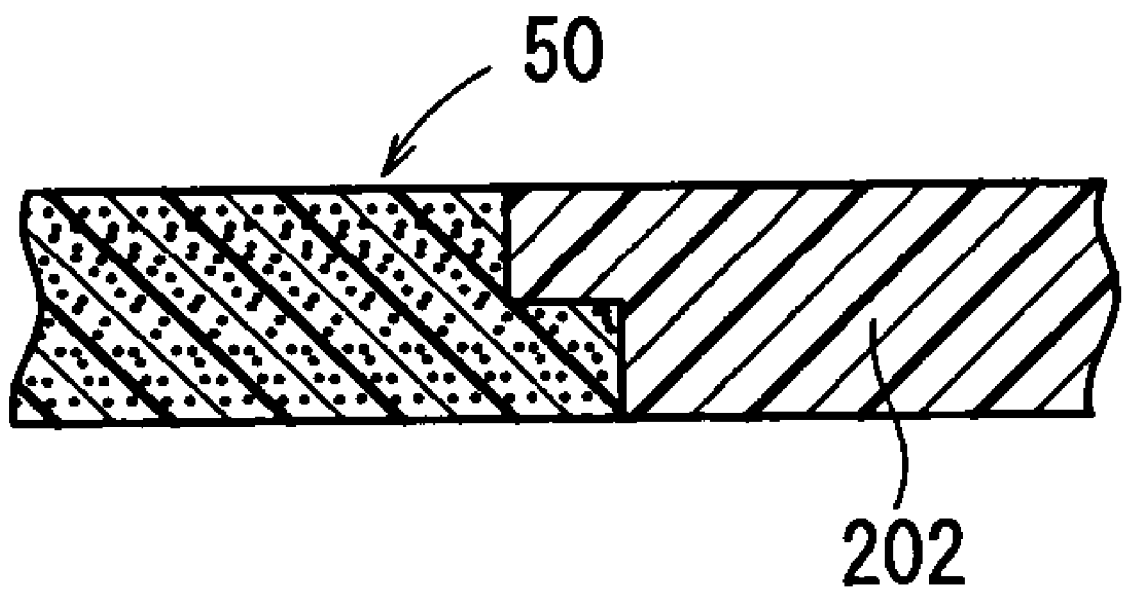
FIG. 18 is cross sectional view showing a resinous junction.

A glass fiber may be used in the passage area 202 for reinforcing the terminal plate 200. Water resistive resin may be used to improve resistance of the terminal plate 200 against the coolant, water vapor, and condensed water. As shown in FIG. 18, the electron conductive area 50 and the passage area 202 may be jointed such that the electron conductive area 50 and the passage area 202 are partially overlapped with each other for improving the joint strength.

According to the present invention, a terminal plate includes an electron conductive area and a passage area. The electron conductive area is connected to an electrode, and made of a composite of porous metal and resin. The passage area is made of insulating resin. Thus, the amount of metal used in the terminal plate is significantly reduced, and the terminal plate has a lightweight. Electrical energy can be collected efficiently from the electron conductive area. The passage area is insulated reliably using the insulating resin. Therefore, it is not required to provide any grommets or insulating coating around fluid passages.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack formed by stacking an electrolyte electrode assembly and separators, and terminal plates in a stacking direction such that said electrolyte electrode assembly and separators are stacked alternately, and said terminal plates are provided at opposite ends in said stacking direction of said fuel cell stack, said electrolyte electrode assembly including an anode, a cathode, and an electrolyte interposed between said anode and said cathode, wherein each of said terminal plates has an electron conductive area, a passage area including at least one of a reactant gas passage and a coolant passage, and a terminal connected to said electron conductive area for collecting electrical energy from said fuel cell stack; and;

said electron conductive area is made of a composite of porous metal and resin and said passage area is made of an insulating resin; and said electron conductive area has an outer density region having a first density and an inner density region, distinct from said outer density region, disposed adjacent to said terminal and having a second density, wherein said first density is less than said second density, such that the density increases from said outer density region to said inner density region in order to increase the amount of electricity collected by the terminal.

2. A fuel cell stack according to claim 1, wherein a surface of said electron conductive area connected to said separator is coated using a conductive material.

3. A fuel cell stack according to claim 1, wherein said terminal includes a planar portion connected to a surface of said electron conductive area.

4. A fuel cell according to claim 1, wherein said resin of said electron conductive area and said insulating resin of said passage area are combined together.

5. A fuel cell according to claim 1, wherein there are one or more regions with different densities disposed between said outer density region and said inner density region, such that the density increases from said outer density region to said inner density region in order to increase the amount of electricity collected by the terminal.

6. A fuel cell according to claim 1 wherein said outer density region has a porosity of 90% and said inner density region has a porosity of 40%.

7. A fuel cell according to claim 1, further comprising an intermediate density region disposed between said outer density region and said inner density region and having a third density, wherein said third density is between said first density and said second density, such that the density increased from said outer density region to said inner density region in order to increase the amount of electricity collected by the terminal.

8. A fuel cell according to claim 7, wherein said outer density region has a porosity of 90%, said intermediate density region has a porosity of 60% and said inner density region has a porosity of 30%.

9. A terminal plate for collecting electrical energy generated in a fuel cell, said terminal plate comprising:

an electron conductive area connected electrically to an electrode of the fuel cell;

a terminal connected to the electron conductive area; and a passage area including at least one of a reactant gas passage and a coolant passage;

wherein said electron conductive area is made of a composite of porous metal and resin and said passage area is made of an insulating resin; and wherein said electron conductive area has an outer density region having a first density and an inner density region, distinct from said outer density region, disposed adjacent to said terminal and having a second density, wherein said first density is less than said second density, such that the density increases from said outer density region to said inner density region in order to increase the amount of electricity collected by the terminal.

10. A terminal plate according to claim 9, wherein there are one or more regions with different densities disposed between said outer density region and said inner density region, such that the density increases from said outer density region to said inner density region in order to increase the amount of electricity collected by the terminal.

11. A terminal plate according to claim 9, wherein said outer density region has a porosity of 90% and said inner density region has a porosity of 40%.

12. A terminal plate according to claim 9, further comprising an intermediate density region disposed between said outer density region and said inner density region and having a third density, wherein said third density is between said first density and said second density, such that the density increased from said outer density region to said inner density region in order to increase the amount of electricity collected by the terminal.

13. A terminal plate according to claim 12, wherein said outer density region has a porosity of 90%, said intermediate density region has a porosity of 60% and said inner density region has a porosity of 30%.

14. A fuel cell stack formed by stacking an electrolyte electrode assembly and separators, and terminal plates in a stacking direction such tat said electrolyte electrode assembly and separators are stacked alternately, and said terminal plates are provided at opposite ends in said stacking direction of said fuel cell stack, said electrolyte electrode assembly including an anode, a cathode, and an electrolyte interposed between said anode and said cathode, wherein each of said terminal plates has an electron conductive area, a passage area including at least one of a reactant gas passage and a coolant passage, and a terminal connected to said electron conductive area for collecting electrical energy from said fuel cell stack; and;

said electron conductive area is made of a composite of porous metal and resin and said passage area is made of an insulating resin; and said electron conductive area has an outer porosity region having a first porosity and an inner porosity region, distinct from said outer porosity region, disposed adjacent to said terminal and having a second porosity, wherein said first porosity is higher than said second porosity, such that the porosity decreases from said outer porosity region to said inner porosity region in order to increase the amount of electricity collected by the terminal.

* * * * *